United States Patent
Flaherty

(10) Patent No.: US 6,903,942 B2
(45) Date of Patent: Jun. 7, 2005

(54) SWITCH MODE POWER CONVERTER

(75) Inventor: Richard C. Flaherty, Fuquay Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 21 days.

(21) Appl. No.: 10/365,099

(22) Filed: Feb. 12, 2003

(65) Prior Publication Data

US 2004/0155638 A1 Aug. 12, 2004

(51) Int. Cl.[7] ............................................. H02M 3/335
(52) U.S. Cl. ........................................ 363/16; 363/19
(58) Field of Search .............................. 363/16, 18, 19, 363/21.1, 21.11, 21.18, 97

(56) References Cited

U.S. PATENT DOCUMENTS

| | | | |
|---|---|---|---|
| 4,878,010 A | | 10/1989 | Weber |
| 5,687,068 A | | 11/1997 | Jamieson et al. |
| 5,896,279 A | * | 4/1999 | Lin .......................... 363/21.11 |
| 5,959,849 A | * | 9/1999 | Batarseh et al. .............. 363/16 |
| 6,018,469 A | | 1/2000 | Poon et al. |
| 6,515,873 B2 | | 2/2003 | Kogel et al. |
| 2002/0003712 A1 | | 1/2002 | Bishel |

OTHER PUBLICATIONS

Product Specicification Sheet and Schematic for Tyco 2090 Series Photo Control (http://energy.tycoelectronics.com/get_file.asp?mFile=/docs/alr27.pdf&mType=1), no date.
Product Specification Sheet and Schematic for Tyco 1060 Series Photo Control (http://energy.tycoelectronics.com/get_file.asp?mFile=/docs/alr26.pdf&mType=), no date.
Product Specification Sheet and Schematic for Tyco LM–1000 Series Photo Control (http://energy.tycoelectronics.com/get_file.asp?mFile=/docs/alr5.pdf&mType=1), no date.
Product Specification Sheet and Schematic for Tyco 2100 Series Photo Control (http://energy.tycoelectronics.com/get_file.asp?mFile=/docs/arl8.pdf&mType=3), no date.
PCT Search Report, corresponding to PCT/US04/003088, mailed on Jul. 13, 2004.

* cited by examiner

*Primary Examiner*—Jessica Han
(74) *Attorney, Agent, or Firm*—John C. Alemanni; Kilpatrick Stockton LLP

(57) ABSTRACT

A regulated, switch mode power converter is described. An embodiment of the present invention provides regulated, switch mode power conversion from alternating current to direct current utilizing a single transistor and associated switching scheme. Embodiments of the present invention are useful in a variety of applications, including, for example, photo control applications.

20 Claims, 2 Drawing Sheets

SWITCH MODE POWER CONVERTER

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to power conversion. The present invention more particularly relates to a regulated switch mode power converter.

BACKGROUND

A variety of devices make use of power converters to convert relatively high voltage alternating current to relatively low voltage direct current as is used in many conventional electronic devices. Some simplistic conventional power converters make use of large, high-voltage resistors to drop the voltage. However, these resistors are inefficient and generate high heat. The heat generated from the resistors requires that the resistors be housed in a large package and include heat dissipating elements, such as heat sinks. Also, the high heat generated by the resistors can lead to problems with reliability and longevity in the resistors and in other electronic components situated near the resistors.

Another conventional approach to power conversion is the use of a switch mode power converter. The switch mode power converters typically require six transistors or a micro-controller to implement. The requirement for multiple transistors or a micro-controller causes the implementation of switch mode power converters to be cost prohibitive in some applications, such as in photo controls.

A small, low cost, efficient switch mode power converter is needed.

SUMMARY

Embodiments of the present invention provide a small, low cost, and efficient switch mode power converter. A method for power conversion according to the present invention comprises using the negative voltage of the negative cycle of an alternating current to commute a plurality of diodes to transport an output voltage to a timing circuit and, further, coupling the negative feedback voltage directly into a pulse forming circuit. In another embodiment, the power conversion method further comprises coupling a photo control circuit to the pulse forming circuit. One embodiment comprises a single transistor in conjunction with various electronic components to flexibly convert any of an array of different voltage alternating current input line voltages to a low voltage direct current output.

Embodiments of the present invention provide numerous advantages over conventional switch mode and non-switch mode power converters. Embodiments of the present invention generate far less heat than conventional non-switch mode converters but still provide regulated power conversion, i.e., embodiments of the present invention are able to accept varying input voltages. Also, unlike conventional switch mode power converters, embodiments of the present invention require a single transistor for power conversion, which leads to a smaller packaging size, less complexity, and less cost that conventional switch mode power converters.

As described above, conventional non-switch mode power converters make use of large, high-voltage resistors, which generate substantial heat. Embodiments of the present invention utilize one bipolar or field effect transistor in conjunction with several relatively low-voltage electronic components. Therefore, embodiments of the present invention are extremely efficient and generate far less heat than conventional non-switch mode power converters, leading to advantages of reliability and of packaging. Also, unlike the simple conventional power converters, embodiments of the present invention are regulated, which allows the converter to accept a variety of input voltages, such as the standard 100 volts in Japan, the standard 120 volts in the United States, or the standard 240 volts in Europe. By providing one power supply able to handle a variety of voltages, the costs of production decrease.

Conventional switch mode power converters are regulated, however, they require several transistors and may require magnetic components as well. An embodiment of the present invention requires a single transistor and no magnetic components, providing both size and cost benefits.

Since one embodiment of the present invention requires only one transistor or transistor substitute, though more may be used, it offers substantial packaging efficiencies over conventional switch mode power converters. These packaging efficiencies allow an embodiment to be used in many applications where a conventional switch mode power converter would not be feasible.

In addition, embodiments of the present invention provide significant cost advantages over a conventional switch mode power converter. An embodiment of the present invention costs approximately fifty percent as much as a conventional switch mode power converter of substantially similar specification.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide a low-cost, efficient, switch mode power supply. Embodiments provide commutation in a power supply that requires only a single transistor. Embodiments of the present invention regulate the average voltage applied to a relay coil so as to keep the average voltage constant over a wide range of power line voltages utilizing the single transistor and a combination of other low-cost elements.

Figure 1:
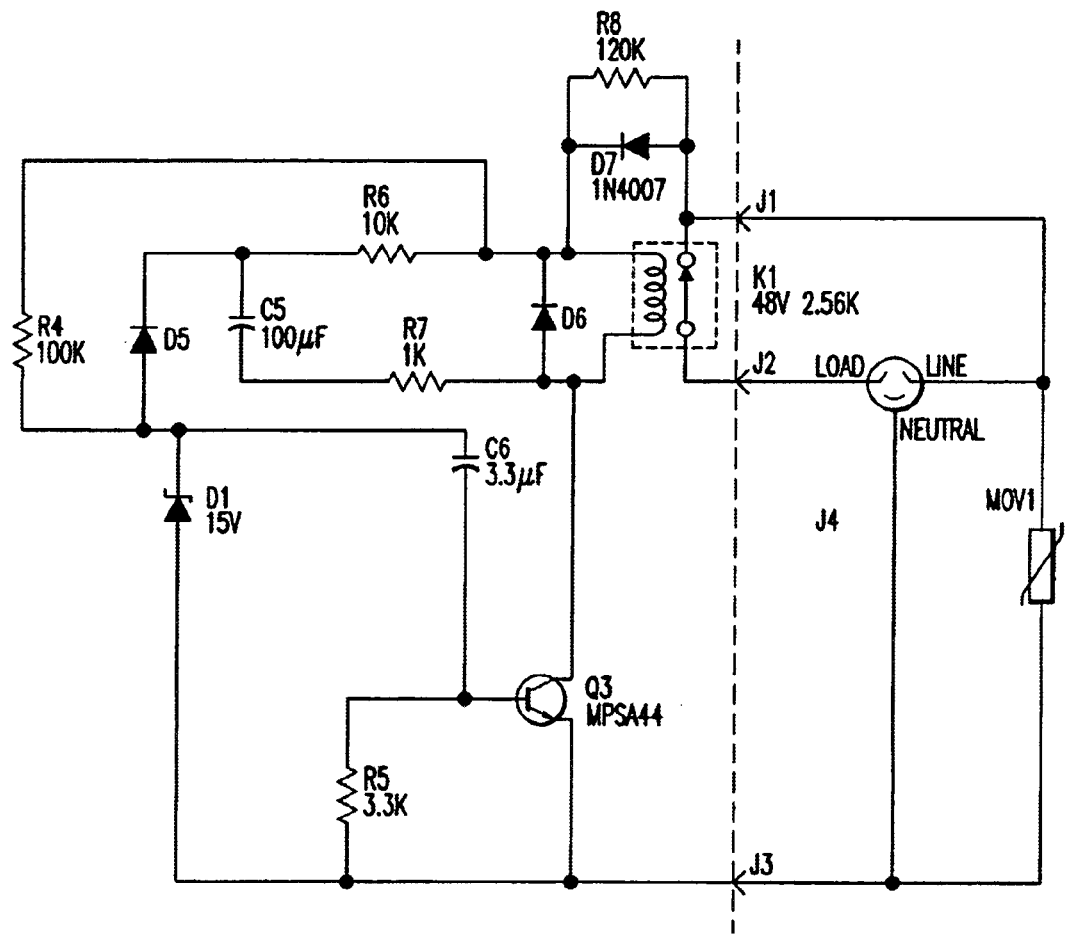
FIG. 1 is a circuit diagram of a power regulator according to one embodiment of the present invention.

Referring now to the drawings in which like numerals indicate like elements throughout the several figures, FIG. 1 is a circuit diagram of a power regulator according to the present invention. The circuit shown is a switch mode power regulator, which implements power line synchronized pulse width modulation (firing angle modulation). The circuit comprises a power circuit and a control circuit. The power circuit comprises an output stage, which comprises a transistor Q3. The transistor's collector circuit comprises a relay K1 and a diode D6, known as a snubber diode, in parallel with the relay K1.

The circuit further comprises a first capacitor C6 coupled to the collector of the transistor Q3, a first resistor R4 coupled in series to the first capacitor C6, and a second resistor R8 coupled in series to the first resistor R4. The circuit shown further comprises a first diode D7 coupled in parallel with the second resistor R8. The circuit further comprises a third resistor R5 coupled to the base of said first transistor Q3, a Zener diode D1, whose cathode is connected to the first capacitor C6, and whose anode is connected to the third resistor R5 and a second diode D5.

The circuit also comprises a fourth resistor R6 coupled in series with the third diode D5, a relay K1 coupled in series with the fourth resistor R6, a third diode D6 coupled in parallel with the relay K1, a second capacitor C5 coupled to the fourth resistor R6, a fifth resistor R7 coupled in series with the second capacitor C5; and a plug, comprising a load, a neutral, and a line, wherein the load is coupled to the relay K1, the neutral is coupled to the emitter of the transistor Q3, and the line is coupled to the variable resistor.

Transistor Q3 regulates the average voltage across the relay coil K1 by means of pulse width modulation. In the embodiment shown, transistor Q3 comprises a bipolar transistor, however, transistor Q3 may instead be a field-effect transistor (FET), or an insulated gate bipolar transistor (IGBT) provided a diode is placed cathode to drain and anode to source.

Transistor Q3 starts conducting at the start of the power line cycle (0 degrees) and continues conducting until enough current has flowed to maintain the relay voltage at the desired level. When transistor Q3 turns off, a voltage will be induced across the relay coil K1 by magnetic induction. This voltage is partially suppressed by diode D6 in order to prevent the failure of transistor Q3 due to over voltage.

The circuit shown in FIG. 1 utilizes half-wave rectification. Half-wave rectification is less expensive that full-wave rectification and requires less components. Since the relay K1 is highly inductive, it does not require a particularly clean DC signal. For example, the DC signal may include a large amount of ripple, which will not affect the operation of relay K1. Half wave rectification allows the circuit to operate in two modes, positive and negative. During the positive half, the transistor Q3 generates a current pulse, which is regulated by the average voltage across the relay K1. This process is pulse width modulation.

The control circuit shown in FIG. 1 comprises a pulse generator whose pulse width varies proportionately with the difference between the Zener voltage of diode D1 and the average voltage across the relay K1. At the start of the power line cycle (0 degrees), a current will begin to flow through diode D7, resistor R4, capacitor C6, and the base of transistor Q3. The current will cause transistor Q3 to turn on, starting a pulse.

Diode D7 and Resistor R8 provide half-wave power rectification. Resistor R8 is applied across the power rectifier D7, applying a negative current during the negative half of the line cycle. Resistor R8 allows a small negative current to be applied. Resistor R8 provides the negative current that switches on transistor Q3 during the negative half of the line cycle. That negative charge conducted through R8 must exceed the charge that conducts through capacitor C6 to assure transistor Q3 will turn on. Negative current switches on rectifier D6 and turns on transistor Q3, providing a current path between the low voltage side of capacitor C5 through resistor R7.

In the embodiment shown, without resistor R7 transistor Q3 would not saturate during the current pulse, causing excessive power to be dissipated in transistor Q3. The transistor Q3 collector voltage would drop until diode D5 would conduct, diverting base current from transistor Q3 and preventing transistor Q3 from saturating. During the transistor Q3 current pulse, a voltage is generated across resistor R7 that will keep diode D5 from conducting and preventing transistor Q3 saturation. To prevent diode D5 from conducting during the positive half of the line cycle, a voltage of at least the capacitor C6 ripple voltage must drop across resistor R7. Transistor Q3 does start conducting until the instantaneous line voltage is approximately twice the Zener voltage of diode D1.

Capacitor C5 filters the voltage across the relay K1. Also, during power up or to the Zener voltage of diode D1 when the circuit will start regulating. Therefore, capacitor C5 shown is large enough a value to prevent its voltage from exceeding the voltage at which regulation is desired.

Capacitor C6 is pre-set to the output voltage and provides a timing functionality. During the positive half of the line cycle, a current flows through resistor R4 to capacitor C6, causing it to start charging, and through the base of transistor Q3, which will turn transistor Q3 on. Transistor Q3 remains on as long a current flows through capacitor C6. Increasing the value of capacitor C6 has the positive effect of increasing the gain of the feed back loop of the regulator circuit. However, increasing the value also slows the time it takes for the current pulse of transistor Q3 to be turned off, increasing commutation losses in transistor Q3, and increases the time for the regulator circuit to stabilize at startup.

As this current flows, the voltage across capacitor C6 increases. When the voltage across capacitor C6 plus the base to emitter voltage of transistor Q3 reaches the Zener voltage of diode D1, the current flowing through capacitor C6 ceases because the current is diverted to the Zener diode D1. Zener diode D1 provides the reference voltage to which the relay coil voltage will be regulated. When the current through capacitor C6 ceases, no current flows to the base of transistor Q3, turning it off and ending the pulse.

During the negative half of the line cycle, a current flows through resistor R8, diode 1)6, the collector and base of transistor Q3, and resistor R5. This current will turn transistor Q3 on. Also, during the negative half of the power line cycle, resistor R5 provides part of the current path through which capacitor C6 discharges into C5.

During the positive half of the line cycle at the end of the current pulse, resistor R5 causes transistor Q3 to more rapidly turn off, reducing energy losses during the commutation of transistor Q3. Resistor R5 will shunt some of the current that would otherwise go through the base of transistor Q3 during the pulse of transistor Q3 base current. If the current shunted is too much, the base current of transistor Q3 will not be enough to turn transistor Q3 completely on.

Capacitor C6 will now discharge into capacitor C5 until their voltages equalize. The voltage across capacitor C5 is equal to the average voltage across the relay coil K1. Diode D7 disconnects during the negative half of the power line cycle assuring that the relay current is direct current.

The circuit shown in FIG. 1 also comprises a voltage averaging circuit, further comprising resistor R6, capacitor C5, and resistor R7. The averaging circuit essentially measures the average voltage across the relay coil K1. The average voltage across capacitor C5 is the voltage to which the circuit is regulated. The purpose of resistor R7, apart from forming part of the averaging circuit is also to ensure that diode D5 will not conduct during the positive half of the power line cycle. The current to resistor R8 flows through diode D6, turning it on, and then the current flows through the collector of transistor Q3, causing it to turn on. When transistor Q3 turns on, it creates a base current between the emitter of transistor Q3 and the negative end of capacitor C5. When the current begins flowing, diode D5 starts conducting, which causes capacitor C6 to discharge until at the same voltage as capacitor C5. The capacitors reach equal voltage at the average output voltage.

This feedback of the output voltage into the pulse forming circuit determines how long each cycle transistor Q3 will be turned on. (The feed back loop is as follows. Average voltage of relay coil K1 voltage—>voltage of capacitor C5—>voltage of capacitor C6—>duty cycle of transistor Q3 commutation—>average voltage of relay coil K1 voltage.) If the average voltage across the relay coil K1 is too low, the voltage across capacitor C6 will be less than the Zener voltage of diode D1 resulting in a longer On time of transistor Q3, which will cause the average relay coil voltage to increase. If the average voltage across the relay coil K1 is too high the voltage across capacitor C6 will approximate the Zener voltage of diode D1, resulting in a shorter On time of transistor Q3, which will cause the average relay coil voltage to decrease.

The circuit shown in FIG. 1 also comprises a plug J4. Plug J4 is a twist lock Hubble type connector, used to connect a line voltage, neutral voltage, and load. The circuit also comprises a metal oxide variable resistor MOV. MOV is not necessary for the operation of the circuit. It provides a level of protection, eliminating high voltage transients like might come from a lightning strike.

A variety of circuits and devices may advantageously utilize the power regulator illustrated in FIG. 1. For example, FIG. 2 is a circuit diagram, illustrating a lighting control system utilizing as a photo control the highly efficient regulated power supply circuit shown in FIG. 1.

Figure 2:
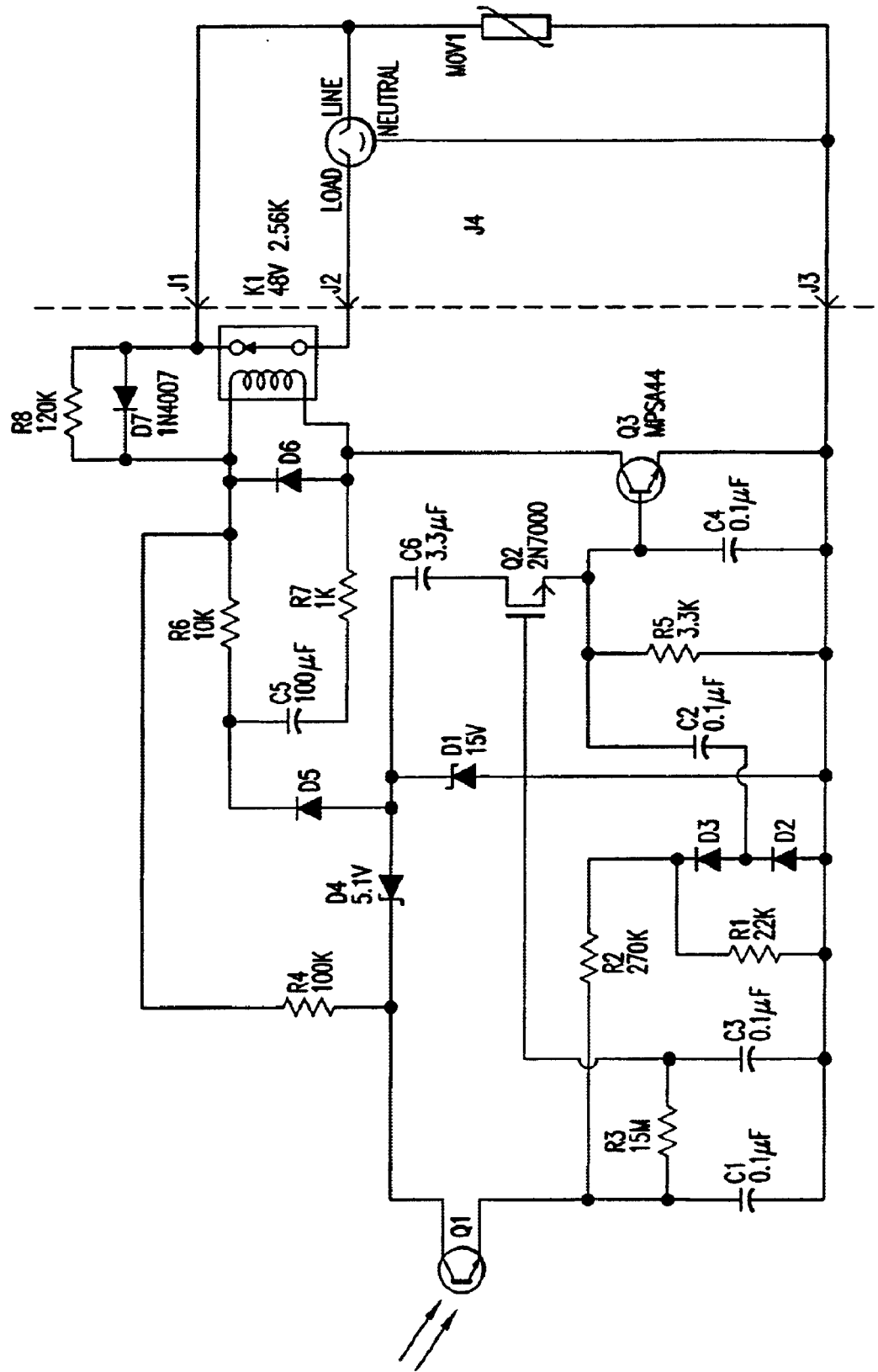
FIG. 2 is a circuit diagram of a photo-controlled power regulator according to one embodiment of the present invention.

The circuit shown in FIG. 2 causes a switch to close at dusk and open at dawn, such as for the control of streetlights. The power line voltage of the circuit shown can range from approximately 87 VAC to 305 VAC and have a power line frequency of 50 Hz or 60 Hz. This flexibility allows the photo control to be usable in almost any alternating current application. To ensure stable operation, the control circuit operates as a Schmitt trigger, switching the output negative at a threshold voltage and not switching back until voltage drops to a lower threshold voltage.

The voltage at the relay coil K1 must be converted from alternating current to direct current and be regulated to assure the correct operation of the relay K1. As noted above, because of the inductive nature of the relay coil K1, its voltage can have a large ripple component and it will still operate correctly. The highly efficient regulated power supply circuit shown in FIG. 1 was designed to supply this regulated direct current to the relay coil K1. Transistor Q2 provides a switch to turn the highly efficient regulated power supply circuit on or off in order to turn on or off the voltage to the relay coil K1 and hence turn a lamp (not shown) off or on. The maximum V drain to source will be equal to the Zener voltage of transistor Q2, 15 V. The maximum drain current is equal to the maximum current that flows through resistor R4.

The current of phototransistor Q1 increases with an increase of ambient light intensity and decreases with a decrease of ambient light intensity. The current from phototransistor Q1 passes through and causes a voltage across resistors R1 and R2. This voltage is proportional to the ambient light level and is referred to as the light signal. As phototransistor Q1's output is a current, the resistor R2, is needed to transform current to voltage. R1 serves to convert the feedback current generated by the charge pump made up of D2, D3, and C2 into a voltage. By adjusting the resistance value of R1 the amount of feedback can be adjusted. This resistor could be called a hysteresis control. In most photo control circuits used in street lighting it is desired that the turn off light level be twice the turn on light level. The value of R1 can be changed until this ratio of on to off light levels is achieved.

As the phototransistors vary greatly in sensibility R2 is usually adjusted to normalize the sensibility to the desired level. R2 is called the "Gain resistor".

Capacitor C1 filters the light signal, removing any high frequency noise components that might be induced by lighting, radio interference, or other causes. If this circuit is shielded from external electromagnetic influences such as radio interference or electromagnetic pulses as caused by lightning, C1 would not be necessary. The low pass filter or time delay circuit, comprising resistor R3 and capacitor C3, causes the light signal to be delayed approximately 1.5 seconds. The delay prevents short duration, transient light sources, such as a passing car headlights or a lighting flash causing the lamp to blink on and off. The output of the low pass filter is applied to the gate of phototransistor Q1 which is commuted on or off by the light signal, turning the highly efficient regulated power supply circuit on or off in order to turn on or off the voltage to the relay coil K1 and hence turn the lamp off or on.

The Zener diode D4 ensures that the phototransistor Q1 has a positive voltage across it. Although diode D4 is illustrated in FIG. 2, as is clear to one skilled in the art, it is not necessary. For example, diode D4 can be replaced with a short circuit, and the circuit would continue to function properly.

Capacitor C4 helps make the circuit resistant to radio interference, lightning discharges, and other interference. Like capacitor C1, if this circuit is shielded from external electromagnetic influences such as radio interference or electromagnetic pulses as caused by lightning, C4 would not be necessary.

Diodes D2 and D3 and capacitor C2 form a charge pump circuit. The charge pump circuit converts peak-to-peak alternating current voltage found across resistor R5 into a direct current of the needed polarity to produce positive feedback. The charge pump circuit provides positive feedback proportional to the relay current (output) necessary to create a Schmitt trigger. The Schmitt trigger input to the phototransistor Q1 helps provide stability.

The transistor Q3 commutes the power to the relay, allowing the addition of only one transistor to the circuit to provide photo control. Positive voltage is derived from the low voltage end of resistor R4.

An embodiment of the present invention may be utilized in a variety of other applications as well. An embodiment provides a general-purpose switch mode regulator providing DC regulated power from substantially any line voltage in the case where the output voltage need not be isolated from the line voltage. For example an embodiment of the present invention would be advantageous as ballast for a light. An embodiment of the present invention would also be useful as the source of power for a light-emitting diode (LED), such as the type used in a building exit sign.

The power regulator may also be advantageously implemented in a wireless remote control for a home computer or intelligent appliance. The computer or appliance comprises a microprocessor control. The power regulator according to the present invention may be economically added to the computer or appliance to power the control circuit. Additionally, in the power conversion industry, a small power supply to power the control circuitry of more powerful energy conversion circuits is often necessary, particularly during start up. An embodiment of the present invention would be particularly advantageous in such an application.

Specifications for Components Shown in FIG. 2

FIG. 2 illustrates one embodiment of a photo control circuit in combination with a switch mode power converter according to the present invention. As is well known to those skilled in the art, the electronic components are complimentary, i.e., changes to one component may necessitate changes to one or more components. The sections that follow describe the process utilized to select components utilized in the embodiment shown in FIG. 2.

| Spread Sheet For Calculating R4 Dissipation | |
|---|---|
| R= | 100000 OHM |
| V= | 305 VAC |
| V Zener d4= | 5.1 VDC |
| V Zener d1= | 15 VDC |
| P= | 0.40584005 WATT |
| Spread Sheet For Calculating Maximum Required R4 Value | |
| R relay= | 2560 OHM |
| Hfe= | 40 Ratio |
| R4= | 102400 OHM |

Capacitor C1—0.1 microfarads, 50 WVDC. This capacitor type is commonly used as illustrated in FIG. 2.

Resistor R2—a value of 270K ohms corresponds to a turn-on-light level of 1.5 FC. This value may vary greatly in other embodiments.

Time Delay Circuit (Resistor R3 and Capacitor C3)—Time delay=R* C. A 0.1-microfarad ceramic capacitor provides a low cost for a given capacitance. And a time constant of 1.5 seconds is desirable since photocontrol customers commonly specify it.

| Input Values | |
|---|---|
| C3= | 1.00E-007 Farads |
| Time Delay= | 1.5 Seconds |
| Results | |
| R3= | 15000000 Ohms |

Capacitor C2–0.1 microfarad. This value provides a high enough capacitance to generate the necessary feedback current in the embodiment shown. If capacitor C2 is too large, the time constant of capacitor C2 and resistor R5 will exceed the minimum pulse width, causing the circuit to regulate the average coil voltage incorrectly. The minimum pulse width in the circuits shown in FIGS. 1 and 2 is expected to be about 1e—3 sec, which is three times the Time Constant determined by resistor R5 and capacitor C2 as determined by the spreadsheet below. Therefore, 0.1 microfarad is an acceptable value for capacitor C2. If capacitor C2 is too small a value, an inadequate positive feedback is produced.

| Time Constant= | (C2 value)*(R5 value) |
|---|---|
| Input Data | |
| C2= | 1.00E-007 Farads |
| R5= | 3300 Ohms |
| Result | |
| TimeConstant= | 3.30E-004 Sec |

Diode D2 and Diode D3—in the embodiment shown, the maximum voltage that can be applied to diode D2 or diode D3 is limited by the Zener diode D1 to 15 Volts. The resistance of resistor R4 limits the maximum current in the circuit.

| Inputs | |
|---|---|
| R4= | 100000 Ohms |
| Vline= | 305 VRMS |
| Ratio of Peak Voltage to RMS Voltage= | 1.414 Ratio |
| Result | |
| Imax= | 4.31E-003 AMP |

Resistor R1—in the embodiment shown, the optimal value is approximately 22K ohms.

Resistor R5—in the embodiment shown, the optimal value is approximately 3.3K ohms.

The duty cycle of transistor Q3 on pulse can be estimated by taking the ratio of the average value of the half wave rectified line voltage and the desired average voltage across relay coil.

| Inputs | |
|---|---|
| Minimum Line Voltage= | 87 VRMS |
| Desired Average Relay Voltage= | 15 VDC |
| Result | |
| Duty Cycle= | 0.3831418 |

The average relay current during the pulse of transistor Q3 collector current would be equal to the average coil current divided by the Duty Cycle.

| Inputs | |
|---|---|
| Desired Average Relay Voltage= | 15 VDC |
| Resistance of Relay Coil= | 2560 Ohm |
| Duty Cycle= | 0.38 |
| Result | |
| Average Q3 Collector Current During Duration Of Current Pulse= | 1.54E-002 Amps |

The average base current of transistor Q3 during the pulse will be the average collector current of transistor Q3 divided by the minimum current gain of transistor Q3.

| Inputs | |
| --- | --- |
| Minimum Q3 Current Gain= | 40 |
| Average Q3 Collector Current During Duration Of Current Pulse= | 1.54E-002 |
| Result | |
| Average Q3 base current during pulse= | 3.85E-004 |

R5 conducts a portion of the transistor Q3 base current so as not to cause Q3 to go out of saturation.

| Inputs | |
| --- | --- |
| Fraction of base current diverted to R5= | 0.5 |
| Base Emitter Voltage of Q3= | 0.6 Volt |
| Average Q3 base current during pulse= | 3.85E-004 Amps |
| Result | |
| R5= | 3116.883117 Ohm |

Capacitor C4—0.1 micro Farad, 50 WVDC. This capacitor value is preferred because it is a very inexpensive and easily available part that is often used for this purpose.

Transistor Q3—the minimum specifications for transistor Q3 are: (1) collector base voltage=431.27 volt; peak collector current of 5.36E—002 Amps. One transistor meeting the minimum specifications of transistor Q3 is transistor MPSA 44. The specifications of MPSA 44 are as follows: collector base voltage of 500 volts; Peak collector current of 6.00E—001 amps.

The switching transistor Q3 sustains a maximum collector voltage.

| Input | |
| --- | --- |
| Maximum V line= | 305 VRMS |
| Ratio VRMS to V peak= | 1.414 |
| Result | |
| V peak= | 431.27 Volt |

The switching transistor Q3 sustains the maximum peak collector current. The duty cycle of the transistor Q3 on pulse is estimated using the ratio of the average value of the half wave rectified line voltage and the desired average voltage across relay coil.

| Inputs | |
| --- | --- |
| Maximum Line Voltage= | 305 VRMS |
| Desired Average Relay Voltage= | 15 VDC |
| Result | |
| Duty Cycle= | 0.1093 |

The average relay current during the pulse of Q3 collector current is equal to the average coil current divided by the Duty Cycle.

| Inputs | |
| --- | --- |
| Desired Average Relay Voltage= | 15 VDC |
| Resistance of Relay Coil= | 2560 Ohm |
| Duty Cycle= | 0.109289617 |
| Result | |
| Average Q3 Collector Current During Duration Of Current Pulse= | 5.36E-002 Amps |

Transistor Q2—in the embodiment shown, the drain to source voltage of transistor Q2 exceeds 15V and the maximum drain current rating of Q2 exceeds 3.33 milliamps.

| Inputs | |
| --- | --- |
| Maximum Line Voltage= | 305 VRMS |
| R4= | 100000 Ohm |
| Vzener of D1= | 15 Volt |
| Ratio of V peak to Vrms= | 1.1414 |
| Results | |
| Maximum Q2 drain current= | 3.33E-003 Amps |

Capacitor C6—a value of 3.3 microfarads is used, as it is a commercially standard value.

| Inputs | |
| --- | --- |
| Ripple on C6= | 0.75 Volts |
| Average Voltage across Relay coil= | 15 Volts |
| Coil Resistance= | 2560 Ohms |
| Minimum Q3 current gain= | 40 |
| Line frequency= | 60 Hz |
| Sub Results | |
| Charge through Q3 collector per line cycle= | 9.77E-005 Coulombs |
| Charge through C6 per line cycle= | 2.44E-006 Coulombs |
| Result | |
| C6= | 3.26E-006 |

Zener Diode D1—provides the reference voltage to which the relay coil voltage is regulated.

Diode D5—is capable of withstanding the line peak voltage, which due to lightning and other surges is the clamping voltage of the variable resistor MOV. The clamping of the variable resistor MOV shown is 720 VDC.

Diode D5.

| Input | | |
| --- | --- | --- |
| C6 ripple= | 7.50E-001 | Volts peak to peak |
| C6= | 3.30E-006 | Farads |
| Line frequency= | 6.00E+001 | Hz |
| Result D5 current= | 1.49E-004 | Amps |

Resistor R6—a 10K ohm resistor as this is a standard commercial value.

| Input | Acceptable Voltage drop across R6= | 1.50E+000 Volts |
| --- | --- | --- |
| Result | R6= | 1.01E+004 Ohms |

Resistor R7.

| Inputs | | |
|---|---|---|
| Vripple C6= | 0.75 | Volts |
| R6= | 10000 | Ohms |
| Vstart pulse= | 23 | Volts |
| Vzener D1= | 15 | Volts |
| Result | | |
| R7= | 1034.4828 | Ohms |

Capacitor C5–100 microfarads.

| Spread Sheet For Determining Start up time | | |
|---|---|---|
| Inputs | | |
| C6= | 3.30E−006 | Farads |
| R4= | 1.00E+005 | Ohms |
| Minimum Line Voltage= | 8.70E+001 | VRMS |
| Ratio Vrms to average for half wave rectified= | 4.50E−001 | |
| V Zener D1= | 1.50E+001 | Volts |
| Result | | |
| Current thru R4= | 3.92E−004 | Amps |
| Full charge of C6= | 4.95E−005 | Coulombs |
| Time to charge C6= | 1.26E−001 | Sec |
| Spread Sheet For Determining The Value Of C5 | | |
| Inputs | | |
| Time to charge C6= | 1.26E−001 | Sec |
| R6= | 1.00E+004 | Ohms |
| R7= | 1.00E+003 | Ohms |
| Minimum Line Voltage= | 8.70E+001 | VRMS |
| Ratio Vrms to average for half wave rectified= | 4.50E−001 | |
| V Zener D1= | 1.50E+001 | Volts |
| Results | | |
| Current in R4 during startup= | 3.56E−003 | Amps |
| C5= | 3.00E−005 | Farads |

Resistor R8—120K ohms.

Determine The Charge that Flows Through C6 During the Negative Portion of the Line Cycle

| Inputs | | |
|---|---|---|
| Vripple of C6= | 7.50E−001 | Volts |
| C6= | 3.30E−006 | Farad |
| Result | | |
| Charge thru C6= | 2.48E−006 | Coulombs |

Determine the Minimum Value of R8

| Inputs | | |
|---|---|---|
| Charge thru C6= | 2.48E−006 | Coulombs |
| Line frequency= | 6.00E+001 | Hz |
| Minimum Line Voltage= | 8.70E+001 | VRMS |

| -continued | | |
|---|---|---|
| Average Voltage to RMS Voltage For half wave rectified sin wave= | 4.50E−001 | |
| Result | | |
| R8= | 2.64E+005 | Ohms |

Transistor Q2—2N7000.

Relay coil K1—48V 2.56K coil. A 24V coil required twice the current, which requires more base current in transistor Q3, which in turn requires resistor R4 to be a more expensive 2-watt resistor instead of a ½ watt resistor. Since 2-watt resistors are more expensive, the cost benefit advantage of using a 24-volt coil is negated.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A switch mode power converter, comprising:
    a load referenced to a first direct current bus having a first polarity;
    a pulse width modulator circuit referenced to a second direct current bus, said second direct current bus coupled to said first direct current bus and having a second polarity opposite said first polarity;
    a first circuit coupled to said second direct current bus, comprising:
        a half-wave rectifier;
        a resistor coupled with said half-wave rectifier; and
        a transistor coupled with said resistor,
    wherein said first circuit is operable to transfer a reference of an output voltage from said first direct current bus to said second direct current bus.

2. The switch mode power converter of claim 1, wherein said resistor coupled in parallel with said half-wave rectifier.

3. The switch mode power converter of claim 1, wherein said transistor comprises a field effect transistor.

4. The switch mode power converter of claim 1, wherein first transistor comprises a bipolar transistor.

5. The switch mode power converter of claim 1, further comprising a control circuit.

6. The switch mode power converter of claim 5, wherein said control circuit comprises a photo control circuit.

7. The switch mode power converter of claim 1, further comprising:
    a second circuit coupled to said first circuit, comprising
        a first diode coupled with said resistor;
        a capacitor coupled with said diode; and
        a Zener diode coupled with said diode,
    wherein the discharge of said capacitor through said diode modulates said pulse width modulator circuit.

8. A switch mode power converter, comprising:
    a first transistor, having a base, an emitter, and a collector;
    a first capacitor coupled to said base of said first transistor;
    a first resistor coupled in series to said first capacitor;
    a second resistor coupled in series to said first resistor;
    a first diode coupled in parallel with said second resistor;
    a variable resistor coupled in series with said first diode and further coupled with said emitter of said first transistor;

a third resistor coupled to said base of said first transistor;

a Zener diode, comprising an anode coupled with said third resistor and a cathode coupled with said first capacitor;

a second diode coupled in series with said Zener diode;

a fourth resistor coupled in series with a third diode;

a relay coil coupled in series with said fourth resistor, said third diode coupled in parallel with said relay coil;

a second capacitor coupled in series to said fourth resistor;

a fifth resistor coupled in series with said second capacitor; and a plug, comprising a load, a neutral, and a line, wherein said load is coupled to said relay, said neutral is coupled to the emitter of said first transistor, and the line is coupled to said variable resistor.

9. The switch mode power converter of claim 8, wherein said variable resistor comprises a metal-oxide variable resistor.

10. The switch mode power converter of claim 8, wherein said first transistor comprises a field effect transistor.

11. The switch mode power converter of claim 8, wherein said first transistor comprises a bipolar transistor.

12. The switch mode power converter of claim 8, wherein said first transistor comprises an insulated gate bipolar transistor having the anode of a diode connected to its source and the cathode of said diode connected to its drain.

13. The switch mode power converter of claim 8, further comprising a control circuit.

14. The switch mode power converter of claim 13, wherein said control circuit comprises a photo control circuit.

15. The switch mode power converter of claim 14, wherein said photo control circuit comprises:

a photo transistor having a base, a collector, and an emitter; said collector coupled with said Zener diode;

a second transistor, having a source coupled to said base of said first transistor;

a sixth resistor coupled to said emitter of said photo transistor;

a charge pump circuit coupled to said sixth resistor;

a second transistor coupled to said charge pump;

a seventh resistor coupled across the output of said charge pump circuit;

a third capacitor coupled to said base of said second transistor and to the anode of said Zener diode;

an eighth resistor coupled to said emitter of said photo transistor and to said third capacitor.

16. The switch mode power converter of claim 15, further comprising a fourth capacitor coupled to said base of said first transistor.

17. The switch mode power converter of claim 15, further comprising a fifth capacitor coupled to said emitter of said photo transistor.

18. The switch mode power converter of claim 15, wherein said charge pump circuit comprises:

a fourth diode coupled to said sixth resistor;

a fifth diode coupled to said fourth diode; and a fourth capacitor coupled to said fourth diode.

19. A method for power conversion comprising:

using a negative feedback voltage of a negative cycle to commute a plurality of diodes to transport an output voltage to a timing circuit; and coupling said negative feedback voltage directly into a pulse forming circuit.

20. The method of claim 19, further comprising coupling a photo control to said pulse-forming circuit.

* * * * *

UNITED STATES PATENT AND TRADEMARK OFFICE
CERTIFICATE OF CORRECTION

PATENT NO. : 6,903,942 B2
DATED : June 7, 2005
INVENTOR(S) : Richard C. Flaherty It is certified that error appears in the above-identified patent and that said Letters Patent is hereby corrected as shown below:

Column 4,
Line 15, the phrase that reads "during power up or to the Zenor voltage of diode D1 when" should read -- during power up or enabling by transistor Q2, transistor Q3 will stay on continuously until it has charged up to the Zenor voltage of diode D1 when --.
Line 44, the word "diode1)6" should read -- diode D6 --.

Signed and Sealed this

Twenty-third Day of August, 2005

JON W. DUDAS
*Director of the United States Patent and Trademark Office*